US007790084B1

United States Patent
Wapner et al.

(10) Patent No.: US 7,790,084 B1
(45) Date of Patent: Sep. 7, 2010

(54) METHOD OF MANUFACTURE OF SEPARATION DEVICES

(75) Inventors: Phillip G. Wapner, Palmdale, CA (US); Wesley P. Hoffman, Palmdale, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 848 days.

(21) Appl. No.: 11/416,514

(22) Filed: Apr. 17, 2006

Related U.S. Application Data

(62) Division of application No. 10/435,004, filed on May 9, 2003, now abandoned.

(60) Provisional application No. 60/379,991, filed on May 13, 2002.

(51) Int. Cl.
*B01D 11/00* (2006.01)
*B01D 39/00* (2006.01)

(52) U.S. Cl. .............................. 264/271.1; 210/500.23; 210/433.1

(58) Field of Classification Search .............. 264/271.1, 264/313; 210/446, 500.23, 433.1, 323.1
See application file for complete search history.

(56) References Cited

U.S. PATENT DOCUMENTS

| 2,404,872 A | * | 7/1946 | Walker, Jr. | ................... 210/649 |
| 5,221,474 A | * | 6/1993 | Yokono et al. | .............. 210/436 |
| 6,315,895 B1 | * | 11/2001 | Summerton et al. | ........ 210/96.2 |

\* cited by examiner

*Primary Examiner*—Matthew J. Daniels
(74) *Attorney, Agent, or Firm*—AFMCLO/JAZ; Bart S. Hersko

(57) ABSTRACT

Provided are methods for fabricating fluid separation devices with precisely-sized, shaped microscopic capillaries that can separate one immiscible fluid from another on the basis of different separation characteristics. In particular, the method comprises the steps of fabricating a first set of capillaries having a first separation characteristic and a second set of capillaries having a second separation characteristic, incorporating one end of all of the capillaries into an inlet face, incorporating the second end of the first set of capillaries into a first outlet face, and incorporating the second end of the second set of capillaries into a second outlet face. Preferably, the first set of capillaries is hydrophillic and the second set of capillaries is hydrophobic.

2 Claims, 6 Drawing Sheets

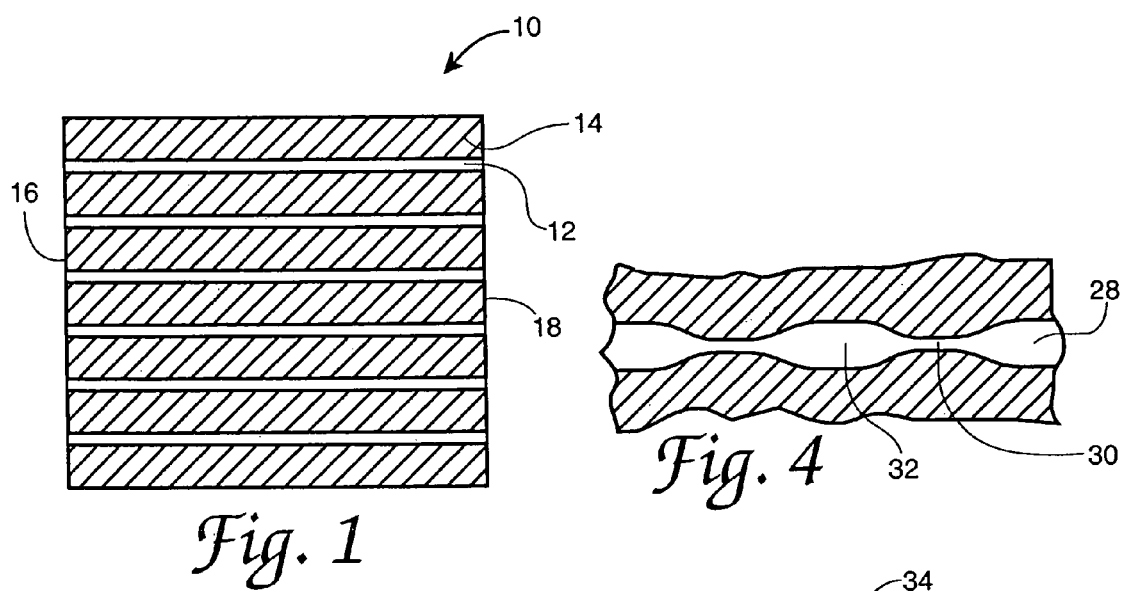
Fig. 1
Fig. 4
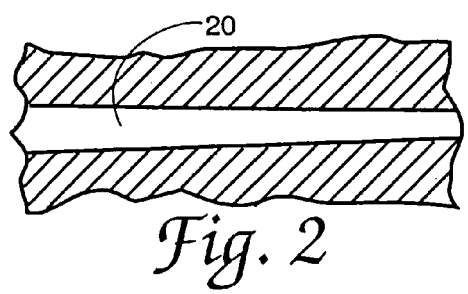
Fig. 2
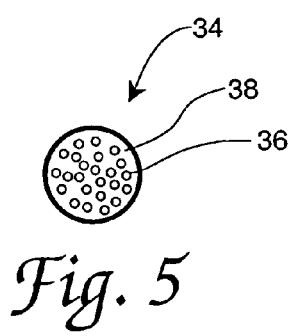
Fig. 5
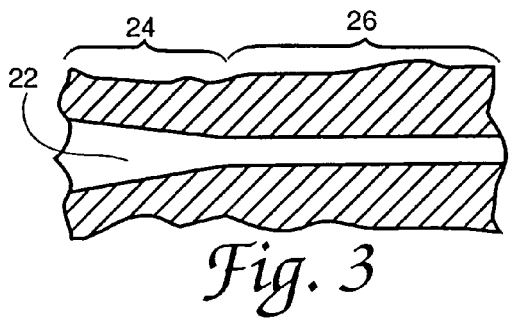
Fig. 3
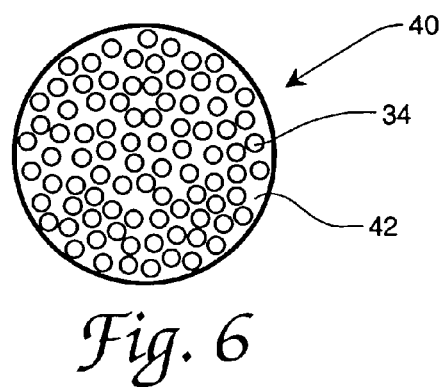
Fig. 6

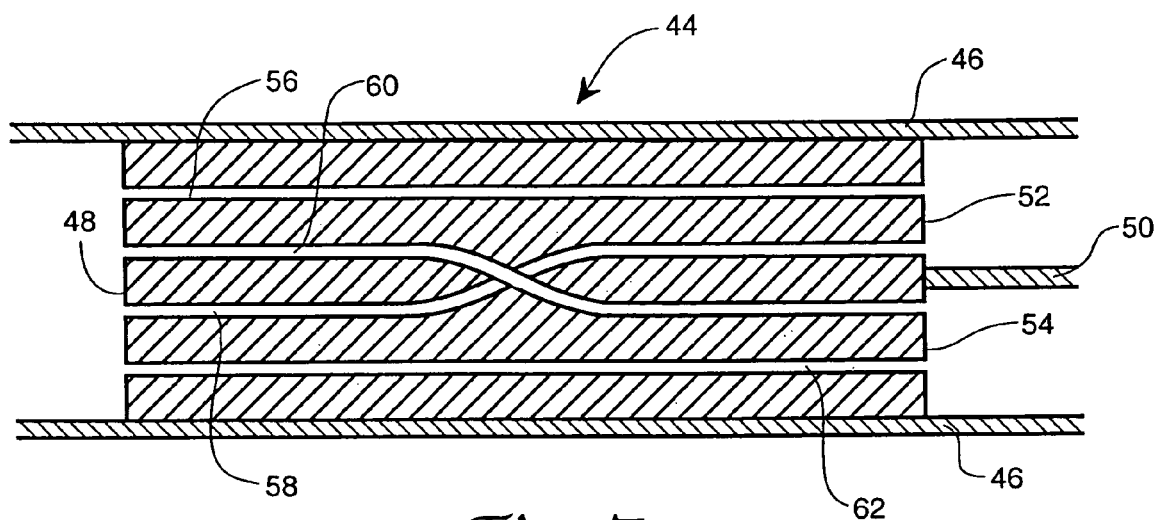
Fig. 7
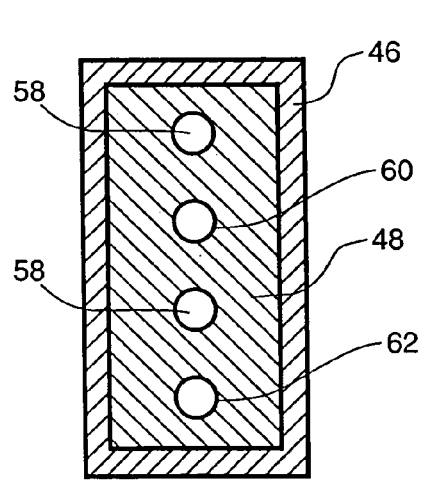 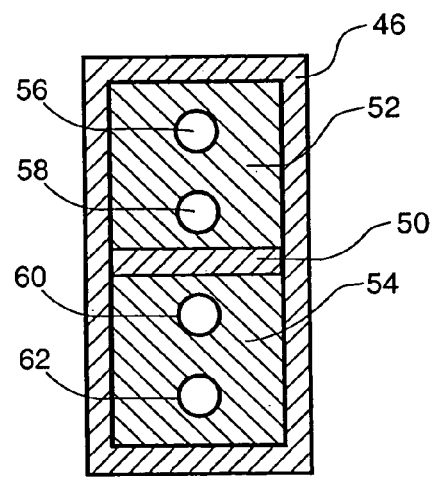
Fig. 8          Fig. 9

METHOD OF MANUFACTURE OF SEPARATION DEVICES

CROSS REFERENCE TO RELATED APPLICATION

This is a divisional application of application Ser. No. 10/435,004, filed May 9, 2003 now abandoned, which claims priority of the filing date of Provisional Application Ser. No. 60/379,991, filed May 13, 2002.

RIGHTS OF THE GOVERNMENT

The invention described herein may be manufactured and used by or for the Government of the United States for all governmental purposes without the payment of any royalty.

BACKGROUND OF THE INVENTION

The present invention relates to the manufacture or fabrication of separation devices. In one aspect, these devices include filters with precisely-sized and shaped microscopic capillaries. In another aspect, these devices include screens with precisely-sized and shaped microscopic mesh size, as well as adaptive and tailorable particulate filtration mediums based on elastic/plastic deformation. In a further aspect, these devices include fluid separation devices with precisely-sized, shaped microscopic capillaries can be employed to separate one fluid from another on the basis of wettability, chemical, physical, electrical, or magnetic characteristics.

In conventional filters, the filtering medium is either rigid, such as sintered metal filters, foamed metal filters, and many paper filters, or flexible as foamed polymer or cloth filters. Whether the filter is rigid or flexible, there is no filtering medium that has precise control over the pores sizes, shapes, and distribution as well as the characteristics of being adaptive, tailorable, and able to remain unblocked for a wide range of particulate sizes.

Conventional rigid filters possess good mechanical strength and function well to remove particulates from gaseous or liquid mixtures, even at high pressure. However, these conventional rigid filters possess a distribution of porosity. The pores in conventional rigid filters do not have a precise and well-defined cross-sectional shape or size. In addition, they are subject to clogging by particulates. Conventional flexible filters, on the other hand, such as those made from polyurethane foam, consist of a reticulated, that is, open cell, structure. In order to increase throughput and decrease backpressure, the ideal reticulated foam filter consists only of attached ligands. This type of structure does not have much mechanical strength and therefore is not very useful at high pressure. If additional material is added to increase mechanical strength, then the fluid throughput will drop. In addition, this type of structure, as with rigid filters, cannot guarantee an exact pore size, but rather provides a distribution of pore sizes around some average value. This distribution of pore sizes does not allow for a precise threshold for particulate exclusion on the basis of size. Finally, conventional microscopic screening is limited in mesh size and mesh shape, the position and arrangement of the individual mesh openings as well as the types of materials that can be employed.

Accordingly, it is an object of the present invention to provide a method for fabricating filter media with precisely-sized and shaped microscopic capillaries.

It is another object of the present invention to provide a method for fabricating screens with precisely-sized and shaped microscopic mesh size.

It is a further object of the present invention to provide a method for fabricating fluid separation devices that can separate one fluid from another on the basis of wettability, chemical, physical, electrical, or magnetic characteristics.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there is provided a method for fabricating filter media with precisely-sized and shaped microscopic capillaries. Also provided are methods for fabricating screens with precisely-sized and shaped microscopic mesh size. These filter media and screens are based upon precisely sized and shaped capillary passages.

Further provided are methods for fabricating fluid separation devices that can separate one fluid from another on the basis of wettability, chemical, physical, electrical, or magnetic characteristics.

Historically, the name given to a microscopic passage has depended on both the material used to form the microscopic passage and the method of formation. For example, if a small tube is drawn down from a larger glass tube it is usually called a capillary; if a polymer filament is extruded in tubular form it is called a hollow fiber; if a small tube is made from human tissue it is called a duct; if a small diameter tube is metallic and used to extract fluid from the body, it is called a cannula.

The term capillary has traditionally referred to a small round tube because they have been drawn from softened glass. The effect of surface tension on the soft glass wall of the tubing being drawn precludes the fabrication of non-rounded features. However, the term capillary as used in this application describes microscopic channels of any cross-sectional and/or axial shape made from any type of material. This term was chosen because a portion of the separation devices described in this invention function on the basis of varying degrees of capillary attraction between the capillary wall and a liquid contained therein. The capillaries in the majority of devices described in this application are imbedded in a solid structure.

This invention describes high- or low-pressure separation devices containing microscopic capillaries with precisely controlled dimensions in rigid or flexible materials having no interconnected porosity. These capillaries can have a variety of axial and cross-sectional shapes, which are useful for filtering particulates from a liquid or gaseous mixture as well as for separating particles on the basis of size. In addition, with the proper axial and cross-sectional shaping of these capillaries, and/or with a flexible adaptive capillary wall material, they are able to exclude particles or trap particles in the capillary and still allow the passage of gaseous or liquid flow through the filter. Finally, the entrance or inner surface of the microscopic capillaries in the separation devices described below can also, be chemically or physically tailored to admit or deny access to liquids and entrained particulates on the basis of wettability as well as chemical, physical, electrical or magnetic selectivity. This provides a rapid and economical means to separate a liquid mixture, separate liquids from gases in both single and two phase systems, and allow the passage of a gas through a separation device while excluding a liquid.

BRIEF DESCRIPTION OF THE DRAWINGS

In the drawings,

FIG. 1 illustrates an axial cross-section of a separation device comprising a plurality of capillaries embedded in a support material;

FIGS. 2 and 3 illustrate capillaries with different axial shapes;

FIG. 4 illustrates a capillary having regions which, in cross-section, have a rectangular shape, and regions which, in cross-section, have the shape of the original capillary-forming fiber;

FIGS. 5 and 6 illustrate one method for fabricating a separation device;

FIGS. 7-9 illustrate a simple fluid separation device with capillaries that differ in separation characteristics;

DETAILED DESCRIPTION OF THE INVENTION

Figure 10:
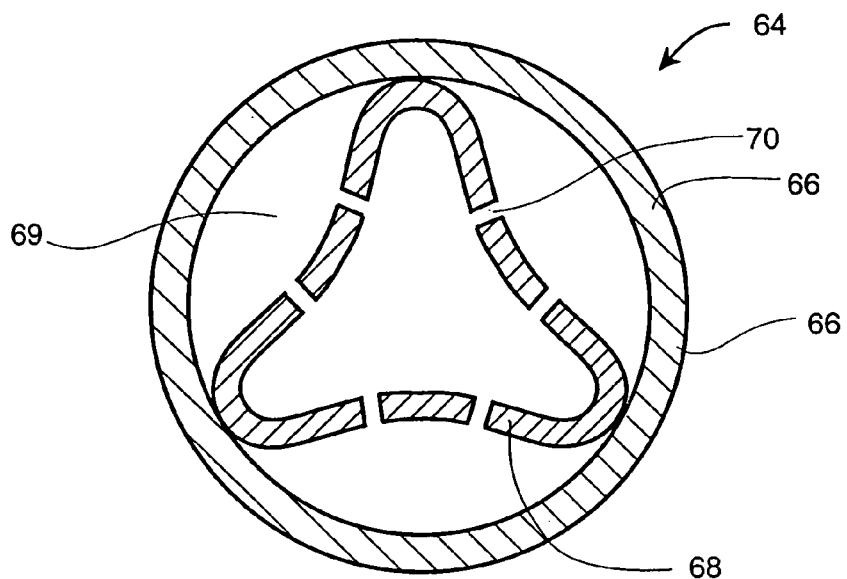
FIG. 10 illustrates a conduit-within-a-conduit separation device.

Referring now to the drawings, FIG. 1 illustrates a separation device 10 comprising a plurality of capillaries 12 embedded in a support material 14 and having an entrance face 16 and an outlet face 18. Device 10 is fabricated employing microtube technology, as disclosed by Hoffman, U.S. Pat. No. 5,011,566, issued Apr. 30, 1991. Briefly, this technology comprises placing a coating on a sacrificial fiber or fibers and then removing the fibers. The inner dimensions and contours of the capillaries will perfectly match the dimensions and contours of the fiber surfaces from which they were formed. In the separation devices of the present invention, capillary 12 can have any cross-section, including round, square, triangular, lobed, rectangular, polygonal and the like. For convenience, the material used to form capillary 12 will be referred to as "fiber". The fiber can have any dimensions needed for the application as long as at least one cross-sectional dimension is in the range of 1-2000 microns.

In addition to the different cross-sections, the capillaries can have different axial or longitudinal shapes. For example, capillary 20, shown in FIG. 2, is tapered, and capillary 22, shown in FIG. 3, has a tapered section 24 connected to a constant diameter section 26. Capillaries with these shapes will increase the fluid flow through a separation device as compared to a capillary with a constant diameter equal to the minimum diameter of the tapered capillary. At the same time a tapered capillary, with the larger end of the taper at the separation device entrance face, will preferentially direct liquid flow towards the exit of the separation device, provided the liquid wets the walls of the capillaries. In addition, a separation device with capillaries of these shapes can be easily back-flushed for cleaning. That is, if the liquid or gas to be filtered enters the filter through the large end of the tapered capillary, any particulates entrained in the liquid or gas will be trapped when they reach the section of the capillary that has the same dimensions as the individual particle or agglomerate. If the liquid to be filtered does not wet the surface of the filter, pressure will be needed to force this liquid through the filter. As a result, each time the pressure is released, the liquid will flow backwards toward the large end of the capillary and out of the entrance of the filter. The flow of liquid in this direction will dislodge any particulates. Any additional pressure applied to the filter on the small diameter exit end of the capillary will enhance the cleaning of the capillaries. On the other hand, if the liquid to be filtered wets the capillary, then it will automatically enter the capillary and flow to the exit of the filter. In this situation, pressure applied to the exit of the capillary will be needed to force the liquid out of the capillary entrance. This reverse flow will again flush out any particulates trapped by the taper.

The fiber material can be carbon, graphite, glass, polymer, metal, alloy, composite, or any material that can withstand the rigors of fabrication and that can be later removed. The support material 14 can be any desired material, including, but not limited to metal, ceramic, polymer, and the like.

The separation devices of this invention are fabricated by placing at least one sacrificial fiber in a suitable mold, fixture, extrusion or pultrusion device, with an orientation principally along the axis of the separation device and, if a plurality of capillary passages are desired, with a desired spacing between pieces of sacrificial fiber. This spacing can be maintained mechanically or by pre-coating the sacrificial fiber with the support material, or other suitable material. Sufficient support material is then provided to fill the interstices between the pieces of sacrificial fiber and to form the external dimensions of the separation device. After solidifying the support material, by appropriate technique, the separation device is removed from the mold, fixture, extrusion, or pultrusion device, and, If necessary, support material is removed to bring the separation device to final external dimensions. Sufficient solidified support material is removed from the entrance face 16 and from the outlet face 18 to expose the end(s) of the sacrificial fiber(s).

The sacrificial fiber(s) is(are) then removed, thereby leaving capillary passages with interior dimensions usually equal to the external dimensions of the sacrificial fiber. For example, carbon or graphite fiber can be removed from a silica support material by reaction with a gas phase species such as air or oxygen, or by dissolution in an acidic liquid medium. A glass fiber can be easily removed with hydrofluoric acid. A polyvinyl alcohol fiber can be removed from an elastomeric support material using hot water.

The sacrificial fiber(s) can also be aligned and held in position by other means, such as by wrapping around a large mandrel, flocking, fixturing, centrifugal force, electrostatic force, or magnetic force. For example, material that can be magnetized, such as some metals and ceramics, can be aligned parallel to each other in a magnetic field because of the ratio of their length to cross-sectional dimensions. Non-conducting material can be aligned similarly in an electrostatic field. Any type of material with significant length to cross-sectional dimension ratio can easily be aligned along the radius of a centrifuge provided one end is immobilized. Regardless of the technique used to align the sacrificial fiber parallel to each other, the spacing between adjacent fibers can be controlled by coating the fibers with material before alignment. If the coating on all the fibers is uniform, the thickness of this layer of material on each fiber is usually equal to half the desired separation distance of the capillaries. However, there is no requirement for all the fibers to have a coating with the same thickness. The coating on the fibers is at least partially solidified either before or while the fibers are held in alignment to group a plurality of coated fibers together.

FIG. 4 illustrates another embodiment wherein the capillary-forming fiber is slightly crimped or flattened at random or fixed intervals prior to incorporating the fiber into the separation device. After solidification of the support material and removal of the fiber, the resulting capillary 28 has regions 30 which, in cross-section, have a nearly rectangular shape, and regions 32 which, in cross-section, have the shape of the original capillary-forming fiber.

One method for fabricating a separation device comprises the steps of (a) selecting a material for the device body, (b) selecting a fugitive fiber or fibers, (c) coating a single fiber with the selected device body material, and, if necessary, at least partially curing the device body material, to provide a single coated fiber, (d) pultruding a plurality of coated fibers from step (c) to fill the interstices between coated fibers and to surround the outermost coated fibers with additional device body material, and, if necessary, at least partially curing the device body material, to provide an assembly of coated fibers, (e) pultruding a plurality of assemblies from step (d) to fill the interstices between assemblies and to surround the outermost assemblies with additional device body material to provide an uncured separation device, (f) curing the product of step (e), (g) cutting the cured product of step (f) into individual separation devices, and (h) removing the fugitive fiber. It will be appreciated by those skilled in the art that the diameter of the separation device will depend on the diameter and number of assemblies pultruded in step (e).

FIGS. 5 and 6 illustrate the above-described method, in part. FIG. 5 illustrates, in cross-section, an assembly 34 of fibers 36 resulting from step (d), above, embedded in a body material 38. FIG. 6 illustrates a separation device 40, in cross-section, comprising a plurality of assemblies 34 resulting from step (e), above, embedded in body material 42, which may be the same as or different from body material 38.

Separation device 40 can also be fabricated from metal or ceramic. A ceramic device can be fabricated by the steps of (a) selecting a ceramic sol material for the device body, (b) selecting a fugitive fiber or fibers, (c) coating a single fiber with the selected device body material, and drying the device body material to provide a single coated fiber, (d) coating a plurality of coated fibers from step (c) to fill the interstices between coated fibers and to surround the outermost coated fibers with additional device body material and drying the device body material, to provide an assembly of coated fibers, (e) coating a plurality of assemblies from step (d) to fill the interstices between assemblies and to surround the outermost assemblies with additional device body material to provide an uncured device, (f) drying the product of step (e), (g) cutting the product of step (f) into individual devices, and (h) calcining the resulting individual devices. The method and apparatus described in Hay, U.S. Pat. No. 5,164,229, issued Nov. 17, 1992, the disclosure of which is incorporated herein by reference, can be used for coating the fibers and fiber assemblies. The fugitive fiber material will be removed in the calcining step.

Alternatively, a metal or ceramic separation device can be fabricated using powder compaction techniques known in the art. Briefly, such a device can be fabricated by laying up alternating layers of powder and parallel fugitive fibers to a desired depth in a suitable fixture or mold, compressing the powder/fiber assembly with applied heat, as necessary, and removing the fugitive fibers. Glass or carbon fibers are suitable fugitive fibers for this application.

Although the separation devices described heretofore have been relatively thick from inlet to outlet, it is within the scope of the invention to fabricate relatively thin screens, grids or membranes by slicing, skiving, paring, or otherwise cutting the fabricated assembly prior to removal of the sacrificial material. Thus, any screen can easily be made from non-deformable materials such as ceramics, plastics, and metals using techniques such as casting, spraying, as well as electroless deposition, electro-deposition, chemical vapor deposition, physical vapor deposition, electrophoresis or some combination of these techniques. The minimum thickness for such screens, grids or membranes is determined by the maximum force per unit area applied through the thickness.

An alternative approach to making thin screens is to make the screen to near-net-thickness. One such method to do this is to use a flocking technique. This involves flocking short fibers with a high aspect ratio of length to diameter into a surface that will allow the fibers to stick at the desired angle with the surface. The desired angle normally being essentially perpendicular to the surface. The fibers can have any cross-sectional or axial shape and can consist of any material such as carbon, polymers, metals, ceramics, or glasses. Thus, such a near-net-thickness screen can be fabricated by flocking short sacrificial fibers onto a backing surface that will allow the fibers to stick at the desired angle with the surface, filling the space with body material, solidifying the body material, removing the backing surface and removing the sacrificial fibers. Alternatively, such a screen can be fabricated by coating a backing surface to a desired thickness with body material, flocking the body material with sacrificial fibers, solidifying the body material, removing the backing surface and removing the sacrificial fibers.

Additionally, it should be mentioned that with thin objects such as screens membranes, grids, and the like, a combination of capillary cross-sectional shape and the angle that the capillary makes with the surface of the finished device can produce a myriad of mesh shapes. For example, the flocking of a round fiber at an angle to the surface will produce an oval mesh shape. The surface into which the fibers are propelled can be of any material that is soft or has a layer of adhesive type material on it in order that the fibers will stick and retain the orientation that they had on impingement. In this approach, the space between the fibers is filled with the material or the precursor to the material that is desired for the screen. If a precursor is employed, it is then converted to the screen material. As described above, the thickness of the screen can be decreased if desired by numerous techniques, such as, cutting, slicing, skiving, grinding, etc. In addition, energetic techniques including the use of lasers or energetic beams of particles, ions, or electrons made be employed for thinning. However, regardless of whether the thickness of the screen is decreased or not, after the space between the fibers is filled, the substrate and any adhesive into which the fibers were flocked is usually but not always removed. Depending upon the type of material, the substrate and any adhesive can be removed by any technique such as solvation, reaction, vaporization, or phase change that does not adversely affect the screen material. In addition, the substrate can be removed by mechanical means, such as, cutting, slicing, skiving, grinding, or polishing. Thus, after the desired amount of material is placed among the fibers filling the space between them to a desired depth, the screen is thinned and polished as desired, and the substrate is removed. The fibers can then be removed to produce the final product.

Thus, the size and shape of the mesh in the screen or the membrane is controlled by the size and shape of the capillaries employed as well as their orientation to the final surface of the device. In contrast, the lateral thickness of the solid mesh material is controlled by the distance between the capillaries while the thickness of the screen or membrane is controlled by the thickness of the slice of material. Obviously, the same techniques used to produce these thin separation devices can also be employed to produce other devices such as grids or accelerators to control charged particles. For these applications the inner surface of at least one section in the mesh can be coated with material to render it either conductive or non-conductive for enhanced focusing. Alternatively, the entire grid can be coated with a material such as a metal or conductive polymer if the material used to form the grid is not conductive.

There are several ways to coat the inner wall of one or more sections in the mesh. For example, the fiber that forms that particular mesh section can first be coated with the desired coating material before they are coated or surrounded with the material used to form the screen. Alternatively, the entire screen can be coated with the desired material after it is formed. If a complete coating is desired, the device is complete when the fibers have been removed. However, if only a coating on the inner walls of the mesh is desired, the coating can be removed from the surface of the screen by polishing both faces of the screen or by any method described above to thin the screen.

It is within the scope of this invention to fabricate a separation device which can separate fluids according to how they wet the inner walls of the capillaries, as well as their chemical, electrical, or magnetic selectivity. For a fluid that does not wet a particular capillary wall, the minimum cross-sectional dimension of that capillary can also be used as a separation characteristic because the pressure needed to force a non-wetting liquid into the capillary depends on the minimum cross-sectional dimension. That is, the pressure ($P_c$) required to force the non-wetting fluid into the capillary is dependent on the minimum cross-sectional radius ($r_c$), the surface tension of the liquid ($\gamma$) and the contact angle ($\theta$) that the liquid makes with the material that it is exposed to on the inner wall of the capillary. This dependence is expressed by the equation:

$$P_c = 2\gamma \cos \theta / r_c$$

Thus, a fluid mixture that impinges upon the capillaries on the entrance face of the fluid separation device can be separated on the basis of the exclusion of one or more components of the fluid mixture by certain capillaries in the fluid separation device entrance face. This selective exclusion from discrete capillaries in the separation device face can be used to separate the components of both single phase and two-phase flows. In addition, these same fluid mixtures can be separated in each individual capillary of the separation device on the basis of minimum capillary cross-sectional dimension as well as the capillary cross-sectional shape in combination with the difference in the wettability of the liquids to the material in the shaped capillary wall.

To function as a fluid separation device and separate fluids on the basis of their exclusion from certain capillaries, it is necessary that the different capillaries in the fluid separation device differ from one another in respect to at least one separation characteristic, such as, their cross-sectional dimensions, wettability, chemical characteristics, electrical characteristics, or magnetic characteristics. Except for the dimensional differences, these separation characteristics arise from the character of the inner wall of the capillary, which depends on the material used to form the wall, any coating on the interior wall or any modification to the material forming the inner wall, such as those employing mechanical, chemical, physical, radiation or energetic particle means. For example, a conductive material can be placed on a portion of or on the entire inner wall surface of a capillary and can function as an electrode(s). A separation voltage can be placed on this electrode to control access to this capillary. Different fluids in a mixture that impinge on the entrance to the separation device might be separated from the other fluids in the mixture by one or more of the separation characteristics. In addition, it is possible for one capillary to allow the passage of more than one fluid.

Thus, to function as a fluidic separation device based on admittance/exclusion, at least one of the capillaries in the separation device must possess at least one characteristic necessary to separate at least one of the fluids in the incident fluid mixture from the others. That is, the device must possess at least one capillary that allows the entrance of at least one of the fluids in the mixture and at the same time excluding at least one other component in incident the fluid mixture. In addition, it is necessary that all the capillaries in the separation device that are able to admit a certain fluid terminate at a precise position on the surface of the separation device such that the effluent of all these capillaries is in common. This effluent can then be collected or it can enter another separation device for further processing.

FIG. 7 illustrates a simple fluid separation device with capillaries that differ in separation characteristics. Although these capillaries can be discrete and individually positioned in the device, the capillaries are grouped into bundles in this example. Shown is a fluid separation device 44 housed in a housing 46, and having an inlet face 48, an outlet divider 50, a first outlet face 52 and a second outlet face 54. Device 44 has two sets of capillary bundles: a first set, labeled 56 and 58, and the second set, labeled 60 and 62. These capillary bundles are similar to assembly 34, shown in FIG. 5; each set of capillary bundles differs from the other set(s) with respect to their separation capabilities. Capillary bundles 56 and 58 provide passage from inlet face 48 to first outlet face 52, while capillary bundles 60 and 62 provide passage from inlet face 48 to second outlet face 54. These capillary bundles are employed rather than individual capillaries in this example because it is less labor intensive to position the same number of capillaries on the faces. Device 44 is shown from the inlet end in FIG. 8, and from the outlet end in FIG. 9. The set labeled 56 and 58 can, for example, be hydrophillic, and the second set, labeled 60 and 62, can be hydrophobic. These capillary sets can have other characteristics, for example, individual fluid wettability in combination with the axial or cross-sectional shape of the capillary. Although all the capillaries able to admit the same fluid are positioned, oriented, and configured to exit the fluid separation device in the same location as a group, in some applications, capillaries with different separation characteristics could be grouped together to exit at the same location. Thus, for example, it would be possible to separate two different fluids from a third. In all the examples of fluid separation, the fluids to be separated can be any combination of liquids or gases. In addition to using devices of the type shown FIGS. 7-9 as separation devices, these devices can also be employed in the reverse mode as static mixers.

The capillaries in the capillary bundles may or may not be hydrophilic or hydrophobic, depending on the material(s) used. A wide variety of hydrophilic materials are available and described in the medical and patent literature. Examples of hydrophilic materials include naturally occurring proteins such as soy extract (Pro-Coat available commercially from Protein Technologies Int., St. Louis Mo.) and polymers such as nylon 66, hydrophilic polyurethane (Hydrothane™ available commercially from Cardiotech Int., Woburn Mass.)

acrylate, polyacrylonitrile, or methacrylate. Also suitable for treating or coating a hydrophobic polymer to make the surface hydrophilic are metallic coatings, fluoro polymers commercially available from Dupont, Slip-Coat® available commercially from STS Inc., Henrietta N.Y., as well as Chemstat® and Maxomer® both available commercially from Chemax Performance Products, Greenville S.C., hyaluronic acid, and surfactants such as the alkyl diethanolamides, including lauric diethanolamide and stearyl diethanolamide, glycerol esters and anionics. These materials may be applied by spraying, wiping, immersion, or other means, so long as appropriate measures are taken to provide a proper coating thickness, typically in the range from 0.025 µm to 1.0 mm, usually from 0.05 µm to 1 µm.

Similarly, a wide variety of hydrophobic coating materials are available and described in the literature. Suitable coating materials include fluoropolymer coatings, such as Fluoropel, Fluorothane ME, Fluorothane MU, and Fluorothane M1 available commercially from the Cytonix Corp., Beltsville Md., as well as those available from DuPont. In addition, almost all polymers known are hydrophobic and can be used as coatings. These materials may be applied by spraying, wiping, immersion, or other means, so long as appropriate measures are taken to provide a proper coating thickness, typically in the range from 0.025 µm to 0.5 mm, usually from 0.05 µm to 1 µm. these coatings must not be soluble in boiling water, non-toxic, and not affected by manufacturing procedures subsequent to their application.

A conduit-within-a-conduit separation device, which is used to separate a fluid mixture either statically or dynamically, is shown in FIG. 10. This device 64 comprises an outer conduit 66, an inner conduit 68, and annular volume 69 bounded by the outer surface of the inner conduit 68 and the inner surface of the outer conduit 66. In the example shown in FIG. 10 the cross-section of the outer conduit 66 is round while the cross-section of the inner conduit 68 is trilobal. However, the cross-sectional shapes of the inner and outer conduits can be any combination of shapes that allows an annular space 69 of appropriate size between the two conduits. The dimensions of the annular space 69 can be controlled by modifying the size of the lobes of the inner conduit 68 in the present example. Alternatively, ribs, for example, could be extruded, pultruded, or molded as part of the outer surface of the inner conduit or the inner surface of the outer conduit or separately to act as stand-off devices and maintain the dimensions of the annular space if the cross-sectional shapes of the two conduits are similar. The inner conduit 68 has a plurality of capillaries 70. The size of these capillaries is greatly exaggerated for the purpose of illustration. Alternatively these discrete capillaries 70 in the trilobal inner conduit could be replaced by three continuous slits which would allow the entire conduit-within-a-conduit device to be extruded or pultruded continuously. In operation, a fluid mixture introduced in the annular space 69 or alternatively into the space enclosed by the inner conduit 68 can be separated by way of the capillaries 70, as described before.

Figure 11:
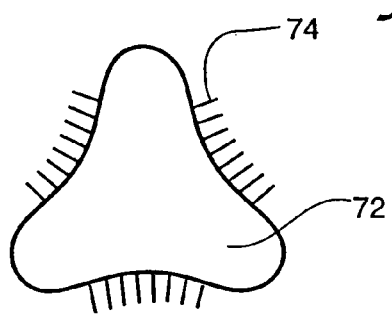
FIGS. 11-14 illustrate fabrication of the device shown in FIG. 10.
Figure 12:
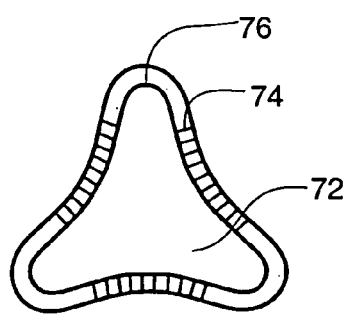
Figure 13:
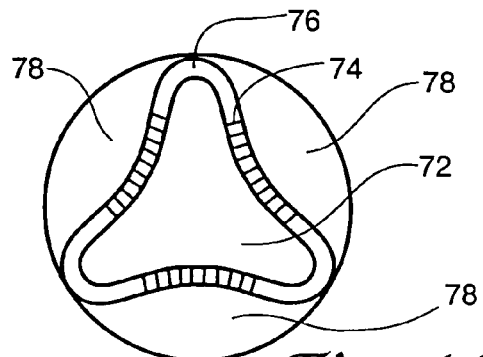
Figure 14:
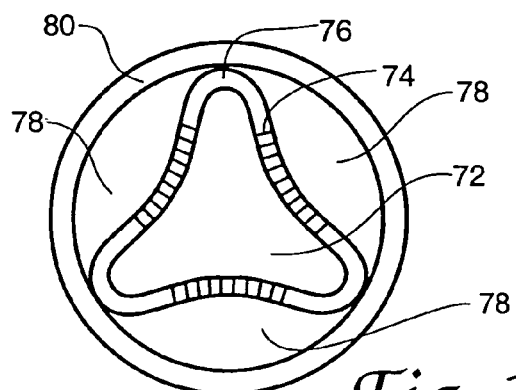

If discrete capillaries are required, fabrication of device 64 starts with an extruded fiber with protrusions or ribs such as a trilobal fiber 72 in FIG. 11. Fiber 72 is flocked with fibers 74. Fibers 72 and 74 are made of a material which is later removed, such as, for example, polyvinyl alcohol. Fiber 72, with flocking 74, is then coated with a different material 76, as shown in FIG. 12, which conforms to the outer periphery of the fiber 72. Coating material 76 can be an elastomeric polymer or any material that is not affected by the processing used to remove the sacrificial material. Coating 76 may be at least partially cured so as to retain its shape during further processing. Material 78, which will be later removed and can be similar to or the same as the material of fibers 72 and 74, is added axially along the assembly of core fiber 72, flocking 74 and coating 76, as shown in FIG. 13. The assembly of core fiber 72, flocking 74, coating 76 and conformal material 78 is then coated with a material 80, which can be the same as or different from material 76. After curing the materials 76 and 80, if necessary, the removable materials 72, 74, and 78 are removed as previously disclosed. Removal of the flocking fibers provides a plurality of capillaries in the wall of the thus-formed inner conduit. Alternatively, the capillaries could be formed using a laser drill after formation of the inner conduit.

If the filtration application uses three slits instead of discrete capillaries 70, the entire device 64 can be fabricated in one step by extrusion or pultrusion, for example. If more than three slits are required, the sacrificial mandrel for the inner conduit can be fabricated with thin ribs which would replace the flocked fibers in FIG. 11 in the current process.

Figure 15:
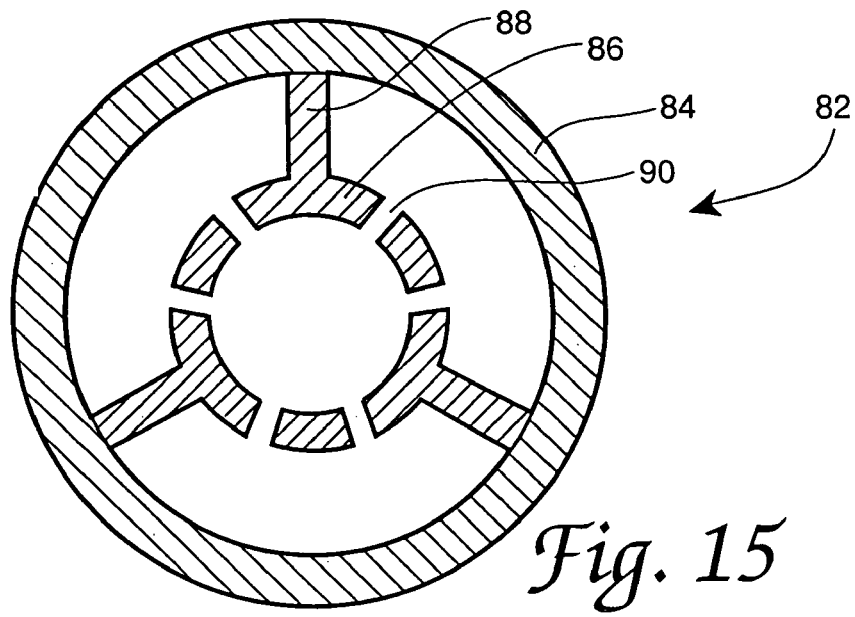
FIG. 15 illustrates another conduit-within-a-conduit separation device.

Another conduit-within-a-conduit separation device 82 is shown in FIG. 15. Device 82 comprises an outer conduit 84, an inner conduit 86 and spacer units 88. Inner conduit 86 has a plurality of discrete capillaries 90. Device 82 can be fabricated as disclosed above. It should be noted that in any conduit-within-a-conduit device the annular volume will be segregated into compartments which can be used to contain different liquids. That is, if capillaries in the inner conduit that communicate with each segmented annular volume have different liquid admittance/exclusion characteristics, then each individual annular compartment can be used to separate a different liquid from the mixture in the inner conduit.

In addition to employing capillaries to separate a fluid mixture on the basis of admittance/exclusion, it is possible to utilize capillaries to separate a fluid mixture on the basis of the individual fluid wettability in combination with the axial or cross-sectional shape of the capillary. This is based on a relationship between the intrinsic contact angle of a fluid with a surface and the included angle formed by that surface. For each liquid/surface pair, there is a transitional included angle that determines whether the liquid will go into an angular feature or capillary. For non-wetting fluids the relationship between the contact angle ($\theta$) and the transitional included angle ($\phi_{tnw}$) is:

$\phi_{tnw} = 2\theta - 180°$

While for a wetting fluid the transitional included angle is:

$\phi_{tw} = 180° - 2\theta$

Figure 16:
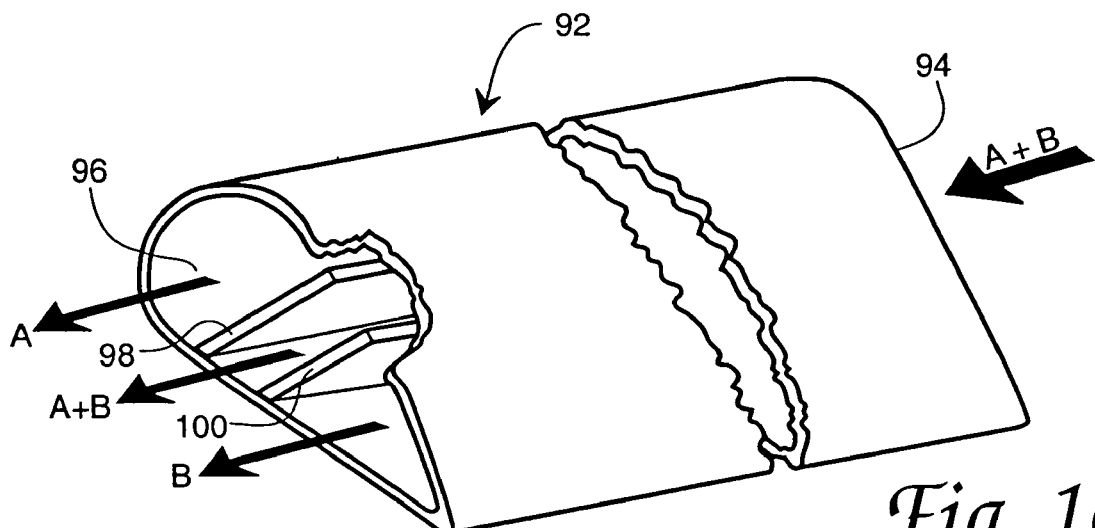
FIGS. 16 and 17 illustrate separation devices for separation of a mixture of immiscible fluids which relies on the geometric shape of the capillary to separate fluid mixtures.

For a non-wetting liquid ($\theta > 90°$), if the included angle between the surfaces of a material or between the portions of the surface of a material is greater than $2\theta - 180°$ the liquid will wet the surfaces of the material that encompass the included angle and will spontaneously flow into the apex of the included angle. If the included angle is less than this value, the liquid will not wet the surface. For a wetting liquid ($\theta < 90°$), although it wets the surface, without an applied pressure it will not spontaneously flow into the small end of a capillary, or a surface feature such as a pore, trench, or pit that has an included angle greater than $180° - 2\theta$ It is possible to employ these relationships for the transitional included angle to separate fluid mixtures on the basis of the geometric shape of the capillary. FIG. 16 illustrates a separation device 92 for separation of a mixture of immiscible fluids utilizing the capillary cross-sectional shape for separation. This figure is shown for the purposes of illustration only and not to limit the technology to this shape. The requirements of such a device for successful separation are that there be a small included section and that the droplet size in the mixture be at least the same magnitude as the capillary dimensions.

Device 92 is shown as a symmetric airfoil-shaped capillary having a chord line or major axis dimension of unit Q, a minor axis or thickness dimension of q, and a length L. The minor axis dimension q is in the range of 1-2000 microns, the ratio of Q:q is about 5:1 to 20:1, and the length L should be at least 1000 q. In airfoil terms, the chord is the straight line connecting the leading and trailing edges, i.e., the bulbous edge and the narrow trailing edge, and the thickness is the distance from the upper to the lower surface, measured perpendicular to the chord line.

Device 92 has an inlet end 94 and an outlet end 96. Outlet end 96 has at least two dividers 98 and 100 to divide the outlet into separated streams. In operation, a gas or a liquid with a low contact angle tends toward the smaller portion of the airfoil shape, while a gas or a liquid with a high contact angle tends toward the larger portion of the airfoil shape. Thus, a fluid mixture A+B entering device 92 at its inlet end 94 is separated within the cross-section of the capillary as the mixture travels its length. At the outlet end 96, the portion of the outlet stream defined by the larger portion of the airfoil shape and divider 98 will primarily contain that portion A of the inlet stream which has a high contact angle; the portion of the outlet stream defined by the smaller portion of the airfoil shape and divider 100 will primarily contain that portion B of the inlet stream which has a low contact angle; and that portion of the outlet stream defined between the dividers 98 and 100 will contain a mixture A+B. The outlet mixture A+B can be recycled to the device for further separation.

Device 92 can be fabricated as disclosed hereinbefore. Briefly, fabrication comprises the steps of providing a shaped fugitive material of desired dimensions that contains the dividers 98 and 100. This can be accomplished by molding or pultruding the airfoil shape containing the dividers that are not affected by the process(es) required for the removal of the fugitive material. The thus-shaped fugitive material containing the dividers is coated with a desired support or body material, after which the fugitive material is removed. Inlet and outlet manifolds can also be fabricated during fabrication of device 92.

Figure 17:
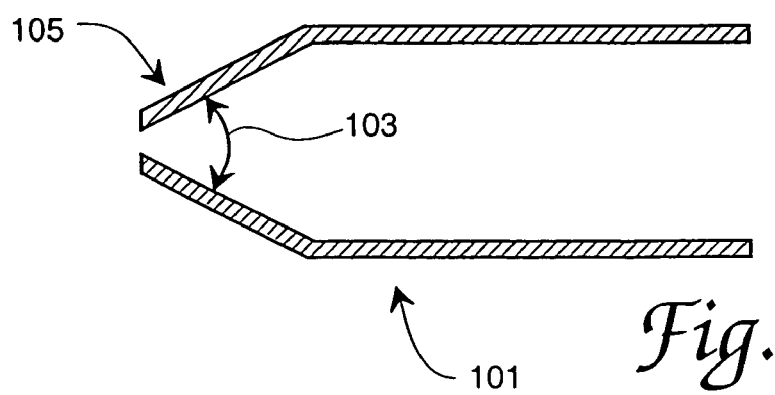

Another type of fluid separator that utilizes a combination of liquid contact angle and the axial capillary geometry is shown in FIG. 17. This figure is but one of the many possible geometries and is not meant to limit the technology. To separate a fluid mixture employing capillary axial geometry, it is only necessary to have at least one tapered transition region at the entrance of the capillary or between linear capillary portions. In this axial fluid separator 101 the included axial angle 103 of the shaped tapered transition region 105 is used to admit or exclude a liquid on the basis of its intrinsic contact angle. That is, at atmospheric pressure a non-wetting liquid can not enter into the tapered transition region from the larger end formed by the included angle unless it has a certain contact angle with the surface forming the transition region. On the other hand, a wetting liquid can not enter the smaller end of the tapered transition region, i.e. the apex of the included angle unless it has a certain contact angle with the material forming the surface of the tapered transition region. It should be noted that this type of separator cannot exclude a wetting liquid if it enters the tapered transition region from the larger end.

Figure 18:
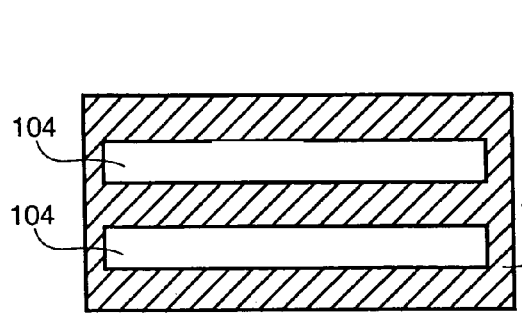
FIG. 18 illustrates a separation device having rectangular capillaries embedded in a body material.

As noted previously, the separation devices of the present invention can have rectangular capillaries. With the rectangular cross-section, the smaller dimension can be made as small as practical to increase capillary pressure on a wetting liquid or increase the pressure needed to force a non-wetting fluid into the capillary while the larger dimension can be increased to allow maximum throughput of liquid. Additionally, this cross-sectional shape is very difficult to completely close off with particulates. FIG. 18 illustrates a separation device 102 having rectangular capillaries 104 embedded in a body material 106.

Figure 19:
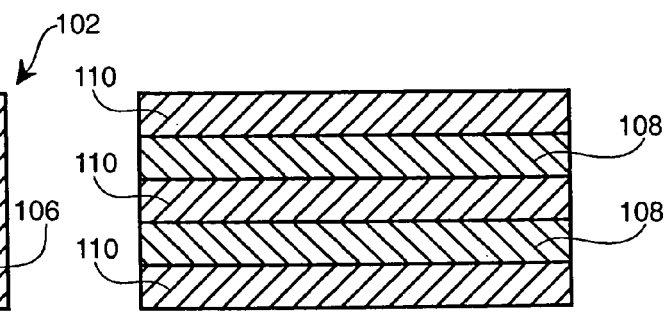
FIG. 19 illustrates fabrication of the separation device shown in FIG. 18.

Device 102 can be fabricated using a stacking layer approach that makes use of fugitive layers rather than fugitive fibers. Referring to FIG. 19, layers of fugitive material 108 are laid up in alternate layers with capillary separation material 110, i.e., the material that separates the capillaries which can be the same as or different from the body material 106 of FIG. 18, to a desired thickness, e.g., at least about 1 mm. Alternate approaches to laying-up layers of material include extrusion of individual or multiple layers, spraying layers, casting layers, pultrusion and the like. The resulting assembly is then consolidated into one piece using heat, pressure, solvent, or the like. Following consolidation, individual separation device cores can be machined or cut from this one piece. Thereafter, the device core is coated with a body material. The surfaces of the capillary separation layers form the major walls of the capillaries after the fugitive material is removed.

Figure 20:
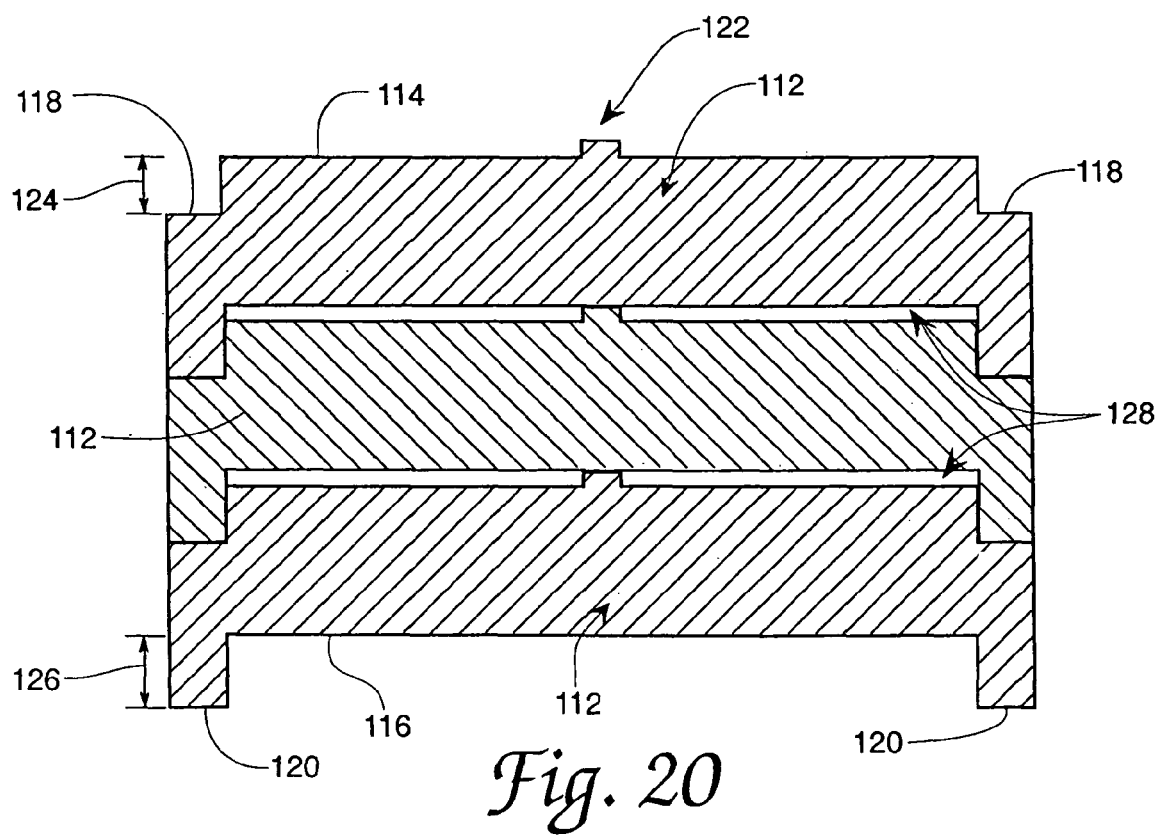
FIG. 20 illustrates a separation device comprising a plurality of layers of shaped sheet or film.

FIG. 20 shows a layered structure comprising a plurality of layers of shaped sheet or film 112 that are able to interlock to prevent lateral movement. Shaped layer 112 can be formed by molding, rolling, casting, extrusion, pultrusion, embossing, 3-D build-up, micro-machining, or MEMS processes such as, photolithography, LIGA, or HARMS. Each layer 112 has a top face 114 and a bottom face 116. Each top face 114 has two depressions 118 and each bottom face 116 has two projections 120. Each top face 114 can also have at least one optional projection 122. Each depression 118 has a depth 124 and each projection has a height 126. Projection height 126 is greater than depression depth 124, so that when the layers 112 are fitted together, rectangular capillaries 128 are defined between layers. The projection 122 serves as a support in the center of each capillary 128 to keep the capillary open under applied pressure. The thickness of capillaries 128 and the height of projection 122 is equal to height 126 less depth 124. In general, the height, of projections 126 is about 0.1 to 1000 microns with a spacing between projections of about 10 to 1,500 microns, and the depth of depressions 124 is about 0.09 to 900 microns with a spacing between depressions identical to said spacing between projections, and the difference between projection height and depression depth is at least 0.01 microns.

Figure 21:
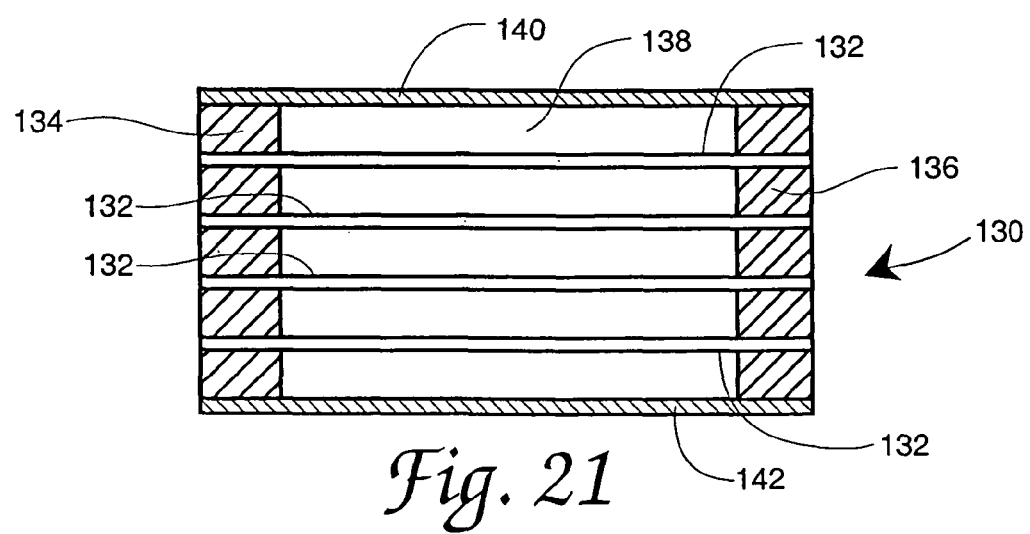
FIG. 21 illustrates a separation device having ductile and/or elastic capillary walls.

Separation devices containing capillaries having elastic or ductile walls can be made to be adaptive so that they cannot become totally clogged. That is, with filters of the present application as with currently available filter technology, particles that are larger than the microscopic passage entrance dimensions will be stopped at the filter entrance while foreign particulates that are smaller than the microscopic passage entrance and larger than the smallest cross-sectional dimension of the microscopic passage will be stopped in the microscopic passage. In addition, if the microscopic passage path is not straight, even particles smaller than the microscopic passage diameter will be stopped. However, what makes adaptable filters of the present application different than current technology is that their mechanical strength can be tailored and the elastic or ductile nature of the capillary walls as well as the filter body in some examples allows deformation of the walls of the precisely-shaped and dimensioned capillaries. This deformation, which is reversible in the case of elastic materials and plastic in the case of ductile materials, allows some liquid or gas under the applied pressure to pass around the blockage. Thus, even though the filter stops the particle, the elastic or ductile material surrounding the particle deforms under the pressure of the liquid or gas and allows a portion of the liquid or gas that previously flowed through the capillary to flow around the particle. As a result, because these filters are adaptive, it is difficult to completely block them. It is, of course, apparent that like the case of the rigid filters, the capillaries in these adaptive filters can also be shaped providing a complimentary non-blocking feature. Filters utilizing ductile and/or elastic capillary walls to separate particulates from a fluid mixture can be made with a process that is similar to that of the other separation devices with the exception that the space between the capillaries is not completely filled with a solid material. The empty space between the capillaries allows for the capillary walls to expand to a greater extent so that gas or liquid can more easily by-pass a clogged portion of the capillary. The separation device 130 shown in FIG. 21 has a plurality of flexible capillaries 132, the ends of which are embedded in endplates 134 and 136. The space 138 between capillaries 132 is not filled. Device 130 has mechanical supports 140 and 142 between the endplates 134 and 136 to keep the endplates spaced apart and to provide support therefor. Alternatively or in addition to these mechanical supports, a low-density flexible or foamed material can be placed in the void spaces 138 between the capillary tubes 132 for mechanical support. The material surrounding the capillaries should preferably be non-porous. However, if there is porosity in the separation device body, it should not be interconnected. Thus, for example non-reticulated structural foams could be used as a separation body material. The capillaries are shown parallel for the sake of simplicity, but they can have any location, orientation, and/or configuration.

Having thus described exemplary embodiments of the present invention, it should be noted by those skilled in the art that the disclosures herein are exemplary only and that alternatives, adaptations and modifications may be made within the scope of the present invention.

We claim:

1. A process for fabricating a separation device based on capillary pressure for separating a fluid mixture containing at least two immiscible liquids, each immiscible liquid having a different separation characteristic, which comprises the steps of fabricating a first set of non-porous capillaries with a desired shape, dimensions, and wall material having a first separation characteristic and a second set of non-porous capillaries with a desired shape, dimensions, and wall material having a second separation characteristic, incorporating one end of all of said capillaries into an inlet face, incorporating the second end of said first set of capillaries into a first outlet face, and incorporating the second end of said second set of capillaries into a second outlet face, said outlet faces being separated from one another; wherein each of said different separation characteristics is each liquids' wettability with respect to the capillary wall material.

2. The method of claim 1 wherein said first set of capillaries is hydrophillic and said second set of capillaries is hydrophobic.

* * * * *